US011167680B2

(12) United States Patent
Glatfelter et al.

(10) Patent No.: US 11,167,680 B2
(45) Date of Patent: Nov. 9, 2021

(54) POD-CENTRIC TRANSPORTATION MODEL SYSTEM

(71) Applicant: The Boeing Company, Chicago, IL (US)

(72) Inventors: John William Glatfelter, Kennett Square, PA (US); Brian Dale Laughlin, Wichita, KS (US)

(73) Assignee: THE BOEING COMPANY, Chicago, IL (US)

( * ) Notice: Subject to any disclaimer, the term of this patent is extended or adjusted under 35 U.S.C. 154(b) by 122 days.

(21) Appl. No.: 16/444,229

(22) Filed: Jun. 18, 2019

(65) Prior Publication Data
US 2020/0398730 A1    Dec. 24, 2020

(51) Int. Cl.
*B60P 3/32*    (2006.01)
*B64D 11/00*   (2006.01)

(52) U.S. Cl.
CPC ............. *B60P 3/32* (2013.01); *B64D 11/00* (2013.01); *B64D 2011/0046* (2013.01)

(58) Field of Classification Search
CPC ......... B60P 3/073; B60P 3/062; B60P 3/1033; B60P 3/1066; B60P 3/1075; B60P 3/00; B60P 3/06; B60P 3/066; B60P 3/05; B60P 3/40
USPC ........ 410/2, 3, 77, 44, 7, 156, 80, 69, 81, 4, 410/51, 52, 121, 100; 280/414.1, 789, 280/781, 656, 79.11, 140, 141, 142, 143, 280/144; 296/3, 100.02, 182.1, 100.03, 296/184.1, 20, 204, 26.03, 50, 43
See application file for complete search history.

(56) References Cited

U.S. PATENT DOCUMENTS

| 2,388,380 | A |   | 11/1945 | Bathurst |            |
|-----------|---|---|---------|----------|------------|
| 3,101,919 | A | * | 8/1963  | Pierre   | B64C 39/022 |
|           |   |   |         |          | 244/177    |
| 3,423,121 | A |   | 1/1969  | Lipkin   |            |
| 3,767,253 | A |   | 10/1973 | Kluetsch |            |
| 4,664,340 | A | * | 5/1987  | Jackson  | B64D 1/18  |
|           |   |   |         |          | 244/136    |
| 4,699,336 | A |   | 10/1987 | Diamond  |            |
| 4,890,083 | A |   | 12/1989 | Trenkler et al. |     |

(Continued)

FOREIGN PATENT DOCUMENTS

| RU | 144783 U1 | 8/2014 |
| UA | 88319 U   | 3/2014 |

OTHER PUBLICATIONS

Tucker, P., Why Your Plane Can't Have An Escape Pod, Defense One, Nov. 24, 2015, Retrieved from the internet URL: https://www.defenseone.com/technology/2015/11/why-your-plane-cant-have-escape-pod/123989/ [retrieved on Jan. 31, 2020], pp. 1-5.

(Continued)

*Primary Examiner* — D Glenn Dayoan
*Assistant Examiner* — Sunsurraye Westbrook
(74) *Attorney, Agent, or Firm* — Coats & Bennett, PLLC

(57) ABSTRACT

A transportation system that includes one or more pods that each includes an interior space configured to house travelers and objects. The pods can be attached to and transported by multiple different vehicles. The different vehicles can provide for different modes of transportation depending upon the plans of the travelers. Different modes include but are not limited to ground travel, air travel, water travel, and rail travel.

20 Claims, 10 Drawing Sheets

(56) References Cited

U.S. PATENT DOCUMENTS

| | | | |
|---|---|---|---|
| 5,065,162 A * | 11/1991 | Akaba | G01S 5/0009 342/417 |
| 6,682,017 B1 | 1/2004 | Giannakopoulos | |
| 7,344,109 B1 | 3/2008 | Rezai | |
| 10,303,171 B1 | 5/2019 | Brady et al. | |
| 10,545,509 B1 | 1/2020 | Jessen et al. | |
| 2002/0172571 A1 * | 11/2002 | Lawrence | B65D 88/129 410/2 |
| 2005/0247824 A1 | 11/2005 | Allison | |
| 2014/0160550 A1 | 6/2014 | Brown et al. | |
| 2015/0266666 A1 | 9/2015 | Wong | |
| 2019/0106021 A1 | 4/2019 | Dietrich et al. | |
| 2019/0271988 A1 | 9/2019 | High et al. | |

OTHER PUBLICATIONS

Star Wars, Escape Pod, Retrieved from the internet: URL: https://www.starwars.com/databank/escape-pod [retrieved on Jan. 31, 2020], pp. 1-4.

* cited by examiner

POD-CENTRIC TRANSPORTATION MODEL SYSTEM

TECHNOLOGICAL FIELD

The present disclosure relates generally to the field of transportation, and more specifically, to the field of transportation systems that include a pod for transporting one or more persons.

BACKGROUND

Much of a traveler's time is spent moving from one environment to another. For example, a business traveler that travels from their office to a business meeting in a remote city moves through a number of different environments. This can initially include a first vehicle, such as a car or public transportation vehicle to travel from their office to the airport. This can also include the interior of the airport while moving through security and waiting at the airline gate. Another environment includes the one or more aircraft used for traveling to the city where the meeting is located. This can then also include another transportation vehicle to travel from the airport to the meeting.

The traveler is required to physically move into and out of each of these environments during their trip. This includes getting into an out of vehicles, sitting in waiting areas, sitting on the aircraft, moving through security, etc. Further, the traveler is required to closely monitor the time to ensure they are at the correct location at the correct time. This movement and monitoring of time makes it difficult for the traveler to be productive. Further, the required effort can be exhausting to the traveler.

SUMMARY

One aspect is directed to a transportation system to transport one or more persons, one or more objects, or a combination of persons and objects. The system includes a pod that has a frame and an interior space formed in the frame and configured to house the one or more persons or objects. One or more pod connectors are positioned on the frame. The system also includes a plurality of vehicles each configured to individually connect to and transport the pod. Each of the vehicles includes a base configured to support the pod and position the interior space for transport, and one or more vehicle connectors positioned on the base and configured to engage with the one or more pod connectors to attach to the pod. At least one of the vehicles is configured to transport the pod by land and at least one of the vehicles is configured to transport the pod by air.

In another aspect, the frame further includes wall segments that extend around and enclose the interior space.

In another aspect, windows in one or more of the wall segments and windows within one or more of the vehicles with the windows of the pod being positioned to align with the windows of the vehicle when the pod is mounted to one of the vehicle.

In another aspect, a first one of the vehicles includes wheels that are driven by an engine or propulsion system to transport the pod over land, and a second one of the vehicles includes an aircraft engine and wings to transport the pod through the air.

In another aspect, at least one of the one or more pod connectors and at least one or more of the vehicle connectors are configured to provide electrical power from the vehicle to the pod.

In another aspect, one or more of the pod connectors and the vehicle connectors include one or more tracks and the other of the pod connectors and the vehicle connectors include one or more bodies that are sized to fit into and slide along slots in the one or more tracks to connect the pod to the vehicle.

In another aspect, one of the pod connectors and the vehicle connectors are connected to a rotatable platform for positioning at a variety of different angular positions.

In another aspect, a heating and ventilation system on the vehicle supplies conditioned air to the pod when the pod is attached to the vehicle.

In another aspect, a first power source in the pod supplies power to the pod and a second power source in each of the vehicles supply power to the respective vehicle with the second power source providing power to the pod when the pod is attached to the vehicle.

One aspect is directed to a transportation system that includes pods and vehicles. Each of the pods includes wall segments that extend around and form an interior space that is configured to house one or more persons, objects, or a combination of persons and objects, and one or more pod connectors positioned on one or more of the wall segments. Each of the vehicles is configured to connect to and transport one or more of the pods. Each of the vehicles includes a base configured to support one or more of the pods, one or more vehicle connectors positioned on the base and configured to engage with the one or more pod connectors of the one or more pods. The vehicles are configured to transport the one or more pods by two or more different modes of travel.

In another aspect, a first one of the pods includes a first size and a second one of the pods includes a different second size with each of the first and second ones of the pods configured to be connected to one or more of the vehicles.

In another aspect, each of the vehicles includes a communication system configured to communicate with a remote entity, and each of the pods is configured to connect to the communication system when the pod is connected to the vehicle.

In another aspect, each of the pods includes a first power source and each of the vehicles includes a second power source with each of the pods configured to use the second power source to supply power to the pod and deactivate the first power source when the pod is connected to the vehicle.

In another aspect, a cabin area is positioned within at least one of the vehicles with the cabin area including seats to transport other travelers that are not within the pods.

In another aspect, at least one of the one pods and at least one of the one vehicles are configured to provide conditioned air from the vehicle to the pod.

One aspect is directed to a method of transportation. The method include: securing an interior space within a pod at a first location while the pod is stationary and unattached with the interior space being in a predetermined orientation; attaching the pod to a first vehicle at the first location while the interior space remains in the predetermined orientation; transporting the pod with the first vehicle from the first location to a remote second location using a first mode of transportation while the interior space remains in the predetermined orientation; detaching the pod from the first vehicle at the second location while the interior space remains in the predetermined orientation; attaching the pod to a second vehicle at the second location while the interior space remains in the predetermined orientation; transporting the pod with the second vehicle from the second location to a remote third location using a different second mode of transportation while the interior space remains in the predetermined orientation; and detaching the pod from the second vehicle at the third location while the interior space remains in the predetermined orientation.

In another aspect, the method includes transporting the pod on the ground with one of the first vehicle and the second vehicle and transporting the pod in the air with the other of the first vehicle and the second vehicle.

In another aspect, the method includes attaching one or more additional pods to the first vehicle and transporting the pod and the additional pods from the first location to the second location using the first mode of transportation.

In another aspect, the method includes moving conditioned air into the pod from a first heating and ventilation system in the pod; attaching the pod to the first vehicle and thereafter deactivating the first heating and ventilation system; and moving conditioned air into the pod from a second heating and ventilation system in the first vehicle.

In another aspect, the method includes attaching the pod to a first section of the second vehicle that is spaced away from a cabin area of the second vehicle.

The features, functions and advantages that have been discussed can be achieved independently in various aspects or may be combined in yet other aspects, further details of which can be seen with reference to the following description and the drawings.

DETAILED DESCRIPTION

Figure 1:
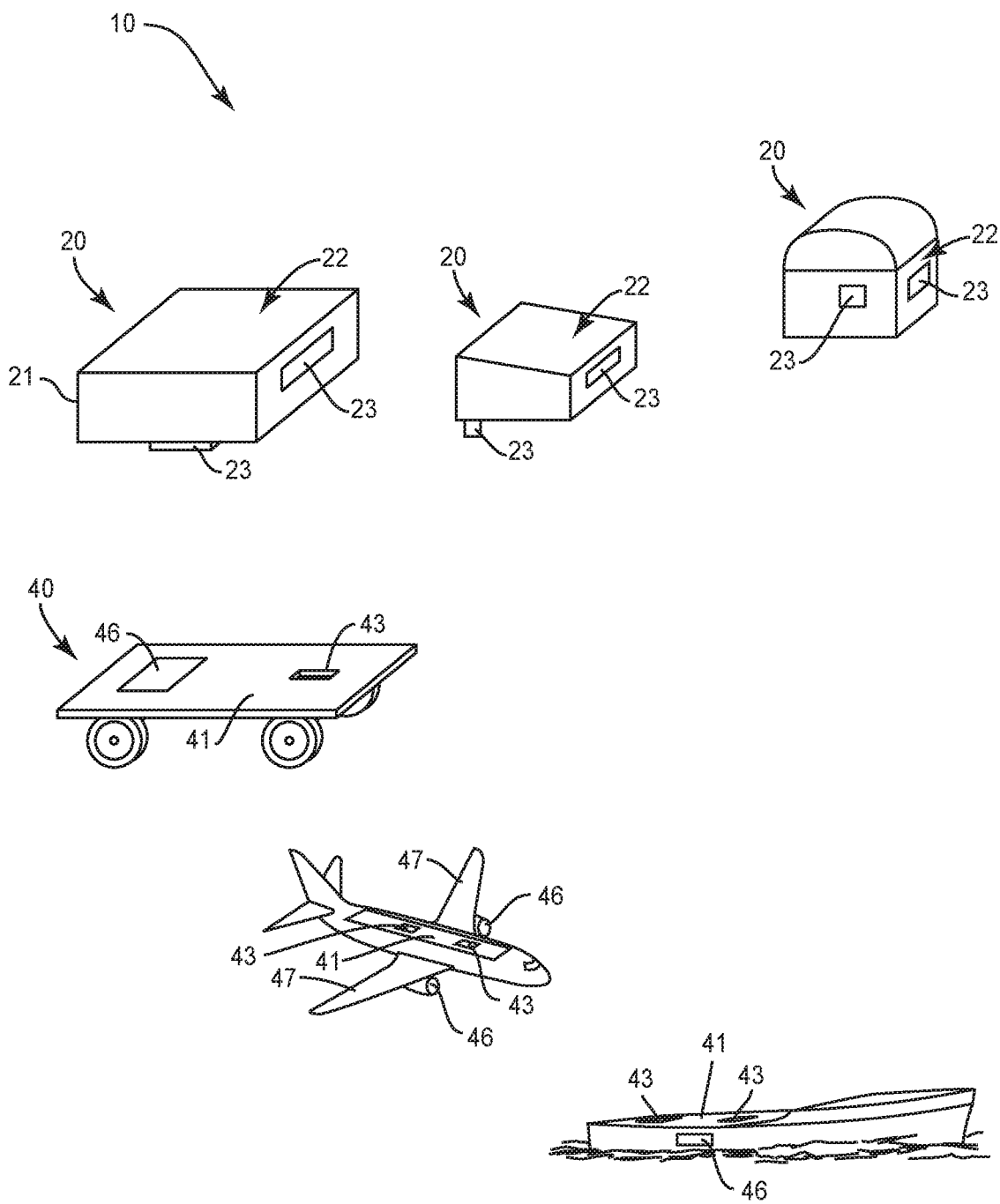
FIG. 1 is a schematic diagram of a transportation system that includes one or more pods and one or more vehicles.

FIG. 1 illustrates a transportation system 10 that includes one or more pods 20. The pods 20 include an interior space 22 configured to house one or more travelers. The pods 20 can be attached to and transported by multiple different vehicles 40. The different vehicles 40 can provide for different modes of transportation depending upon the plans of the travelers. Different modes include but are not limited to ground travel, air travel, water travel, and rail travel (e.g., train).

Each of the pods 20 includes one or more connectors 23 and the vehicle 40 includes one or more connectors 43. The connectors 23, 43 provide for the pods 20 to mechanically engage with the vehicles 40 in a secure manner during the transportation. This engagement can also provide for one or more of electrical power, communication systems, and HVAC to be supplied from the vehicle 40 to the pod 20 during the transportation.

During use, a traveler is housed within the pod 20. The pod 20 can be attached to and transported by one or more vehicles 40 during a trip. For example, the pod 20 can be initially connected to and transported by a land-based vehicle 40 for transportation to an airport. The pod 20 can then be connected to and transported by an aircraft 40 for transportation to a remote destination. During the travel with the two separate vehicles 40, the traveler remains within the pod 20 with little to no interruptions that would otherwise occur during their travel.

Figure 2:
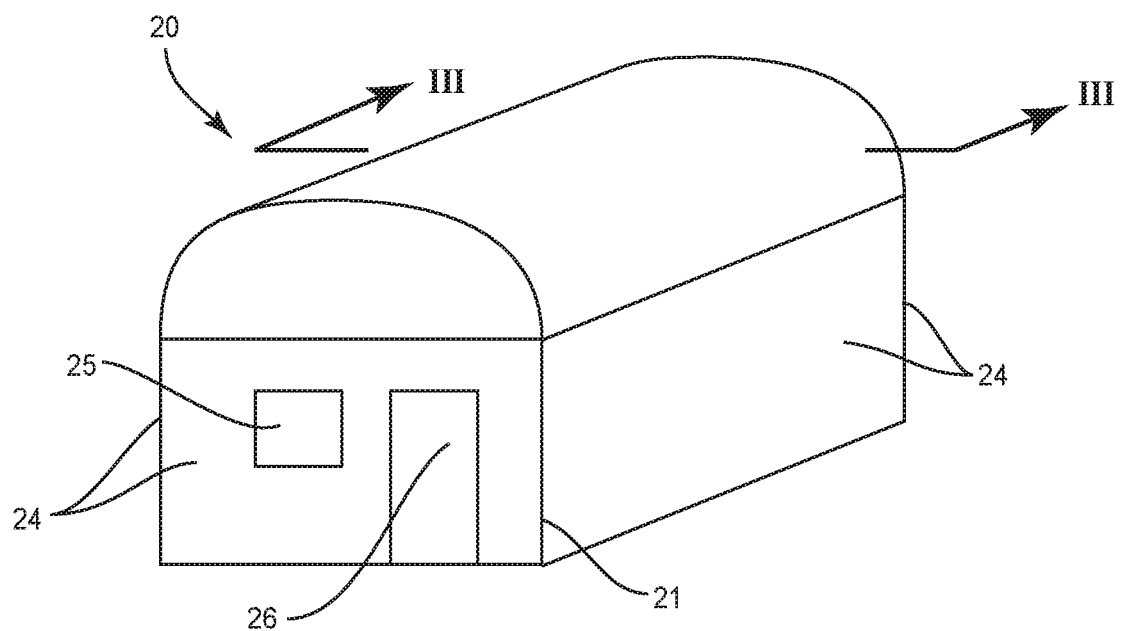
FIG. 2 is a schematic perspective view of an exterior of a pod.

FIG. 2 illustrates a pod 20 that includes a frame 21 that extends around and forms the interior space 22. The frame 21 can include one or more wall segments 24 that can be configured in various shapes and sizes. One or more of the wall segments 24 can be opaque to provide for privacy within the interior space 22. One or more of the wall segments 24 can be translucent to allow light from the exterior to enter into the interior space 22. One or more windows 25 can extend through one or more of the wall segments 24 to allow the travelers to view their environment during travel. One or more doors 26 provide for access into and out of the interior space 22. The windows 25 and doors 26 can be configured to be closed or opened during travel. For example, the windows 25 can be opened to provide air into the interior space 22 during travel on the ocean.

Figure 3:
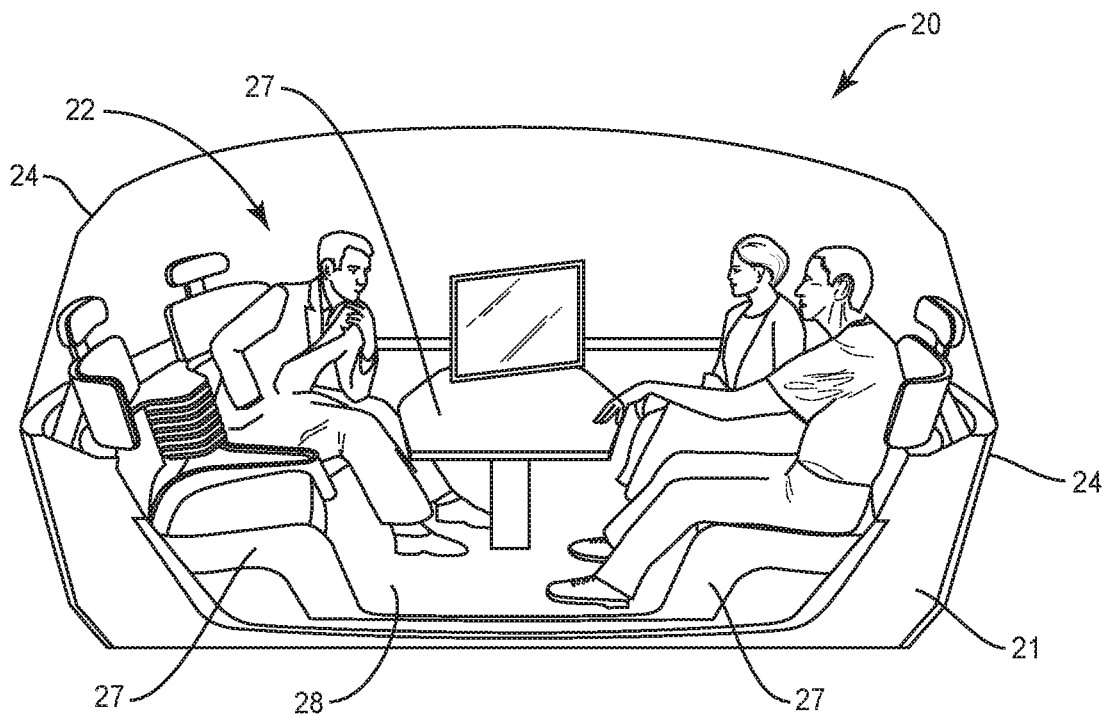
FIG. 3 is a section view cut along line of FIG. 2.

FIG. 3 illustrates an interior space 22 configured as a meeting space. Furniture 27 such as chairs, tables, and couches are positioned to facilitate the meeting. In one example, one or more of the pieces of furniture 27 are secured to the floor 28. This provides for the furniture pieces 27 to remain upright during movement of the pod 20. This movement can be caused by various forces, such as but not limited to turbulence during flight, wave motion during sea travel, vibrations during land travel, or movement of the pod 20 from one vehicle 40 to another. In one example, one or more of the furniture pieces 27 remain unattached and are freely movable by the travelers around the interior space 22.

The interior space 22 is designed to facilitate the traveler's needs during travel. This can include but is not limited to the interior space 22 configured as a meeting space during business travel, a bedroom for overnight travel, various general seating arrangements for business and social travel, as an office with one or more desks, a theater arrangement to watch movies during travel, and various other arrangements.

Figure 4:
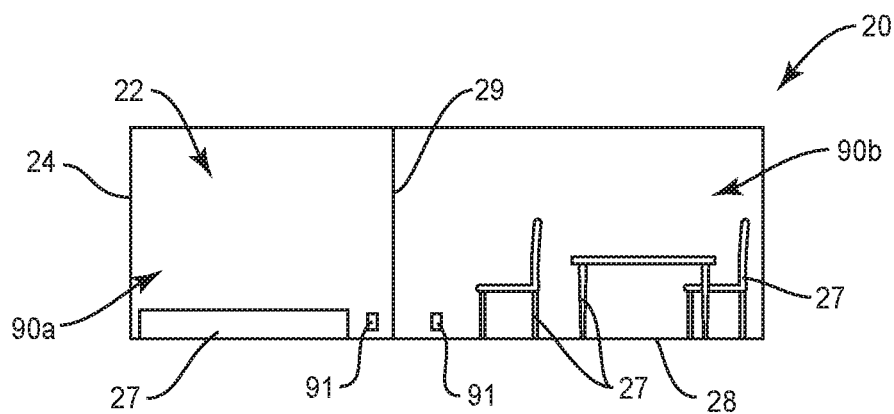
FIG. 4 is a schematic side view of an interior space of a pod.

One or more partitions 29 can also be mounted to divide the interior space 22 into separate compartments 90. FIG. 4 includes a partition 29 dividing the interior space 22 into a first compartment 90a with furniture 27 such as a bed for sleeping, and a second compartment 90b with furniture 27 that includes chairs and a table. The partition 29 can be configured to attach to mounts in one or more of the floor 28 and wall segments 24. This provides for the partition 29 to be moved and situated as needed.

Figure 5:
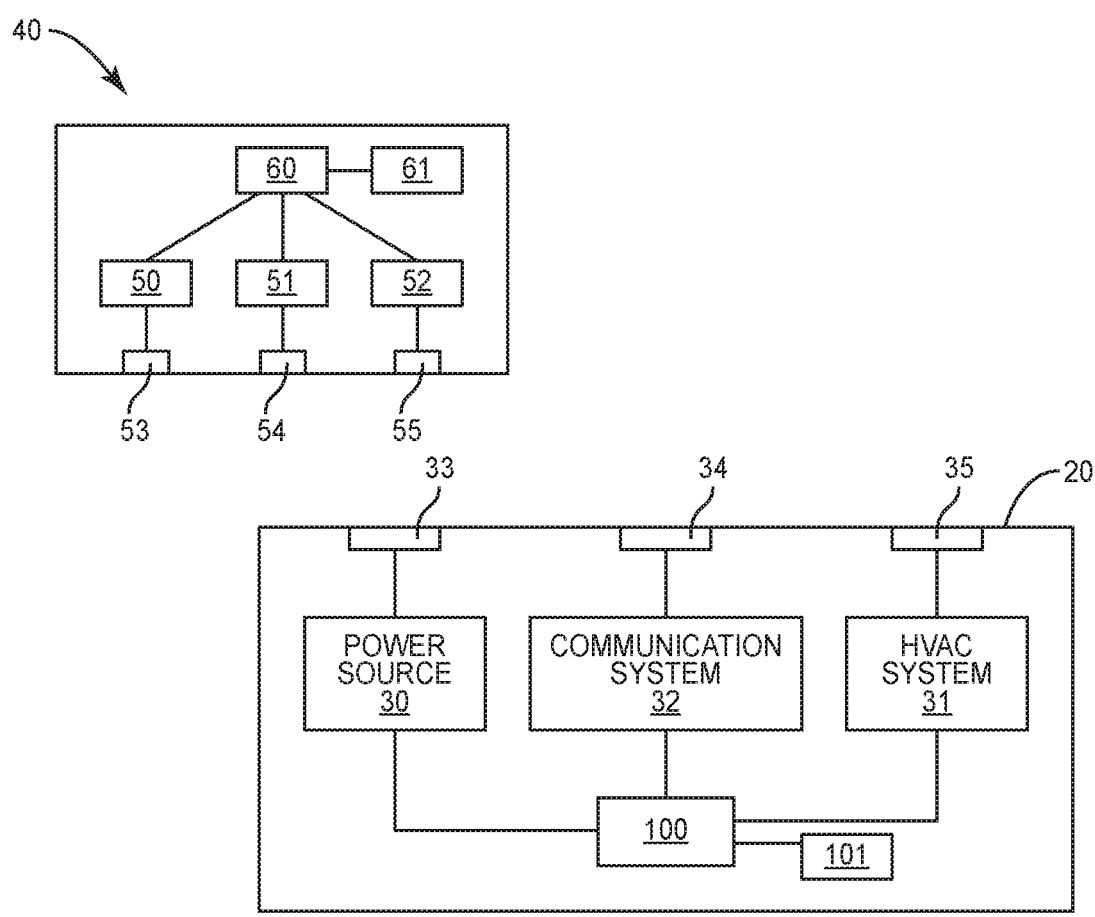
FIG. 5 is a schematic diagram of a utility system of a pod and a utility system of a vehicle.

The pods 20 can each be equipped with one or more utility systems. As illustrated in FIG. 5, this can include a power source 30 to power various electrical components. The components can be mounted within the interior space 22, such as a television or lights. The power source 30 can include one or more outlets 91 (see FIG. 4) to supply power to the travelers own components (e.g., laptop computer, phone charger). The power source 30 can include one or more batteries. One or more solar panels can be positioned on an exterior wall segment 24 and connected to the one or more batteries for recharging.

One utility function includes a heating and air conditioning system (HVAC) 31 to control the air temperature within the interior space 22. The HVAC system 31 can include one or more heating units and cooling units. Ducting can extend throughout the pod 20 to distribute the conditioned air.

A communication system 32 can provide for communications with remote entities. This can include communication over a mobile communication network (e.g., a WCDMA, LTE, or WiMAX network). This can also include communication with a local area network, and can operate according to the 802.11 family of standards, which is commonly known as a WiFi interface. The communication system 32 can also provide for satellite communications.

The pods 20 can also include a control processor 100 and memory circuit 101. The control processor 100 controls overall operation of the pod 20 including one or more of the utilities according to program instructions stored in memory circuit 101. The main control processor 100 can include one or more circuits, microcontrollers, microprocessors, hardware, or a combination thereof. Memory circuit 101 includes a non-transitory computer readable storage medium storing program instructions, such as a computer program product, that configures the control processor 100 to implement one or more of the techniques discussed herein. Memory circuit 101 can include various memory devices such as, for example, read-only memory, and flash memory. Memory circuit 101 can be incorporated with the control processor 100, or the two can be separate.

The vehicles 40 can also each be equipped with one or more utility systems. As illustrated in FIG. 5, this can include a power source 50 such as one or more batteries. The vehicles 40 can also include a communication system 51 for communications over one or more of a mobile communication network (e.g., a WCDMA, LTE, or WiMAX network), local area network that can operate according to the 802.11 family of standards. The communication system 51 can also provide for satellite communications. An HVAC system 52 can include one or more heating units and cooling units, as well as ducting that extends throughout the vehicle 40 to distribute the conditioned air.

Each of the vehicles 40 can also include a control processor 60 and memory circuit 61. The control processor 60 can include one or more circuits, microcontrollers, microprocessors, hardware, or a combination thereof. Memory circuit 61 includes a non-transitory computer readable storage medium storing program instructions, such as a computer program product, that configures the control processor 60 to implement one or more of the techniques discussed herein. Memory circuit 61 can include various memory devices such as, for example, read-only memory, and flash memory. Memory circuit 61 can be incorporated with the control processor, or the two can be separate.

These utility systems provide functionality to the vehicle 40. For example, the communication system 51 provides for the vehicle 40 to communicate with one or more remote entities. The HVAC system 52 provides heating and cooling to the vehicle 40. When the pod 20 is connected to the vehicle 40, one or more of these utility systems can also provide utility to the pod 20. As illustrated in FIG. 5, one or more of the functional systems include connectors 53, 54, 55 respectively, to provide the corresponding utility to the pod 20. The pod 20 includes corresponding connectors 33, 34, 35 that connect to the connectors 53, 54, 55 when the pod 20 is attached to the vehicle 40. This provides for the vehicle 40 to provide one or more of the utilities to the pod 20.

In one example, the utility systems on the pod 20 continue to operate when the pod 20 is attached to the vehicle 40. For example, the HVAC system 31 continues to control the air temperature within the interior space 22. Communication system 32 can continue to operate to provide communications with outside entities. In another example, the corresponding utility system on the pod 20 is deactivated when the pod 20 is connected to the vehicle 40 and the vehicle 40 can supply the corresponding utility. For example, the HVAC system 51 from the vehicle 40 provides conditioned air to the interior space 22 and the HVAC system 31 is deactivated. The corresponding connectors 23, 33 can include ducting to provide for the passage of the conditioned air from the vehicle 40 to the pod 20. In another example, the power source 50 can provide power to the pod 20 when the corresponding connectors 33, 53 are connected, and the power source 30 is deactivated.

The pod 20 and vehicle 40 can each include the same utility systems. In another example, the pod 20 and vehicle 40 can include different utility systems. For example, the vehicle 40 can include a communication system 51 but the pod 20 does not include its own communication utility. Thus, the pod 20 is not able to support communications when detached from the vehicle 40. Once attached, the pod 20 can be connected to the communication system 51 in the vehicle 40 and provide this utility to the traveler.

The pods 20 and vehicles 40 can include a variety of different utility systems. Examples include but are not limited to power sources, communication system, HVAC systems, and plumbing/water systems.

Figure 6:
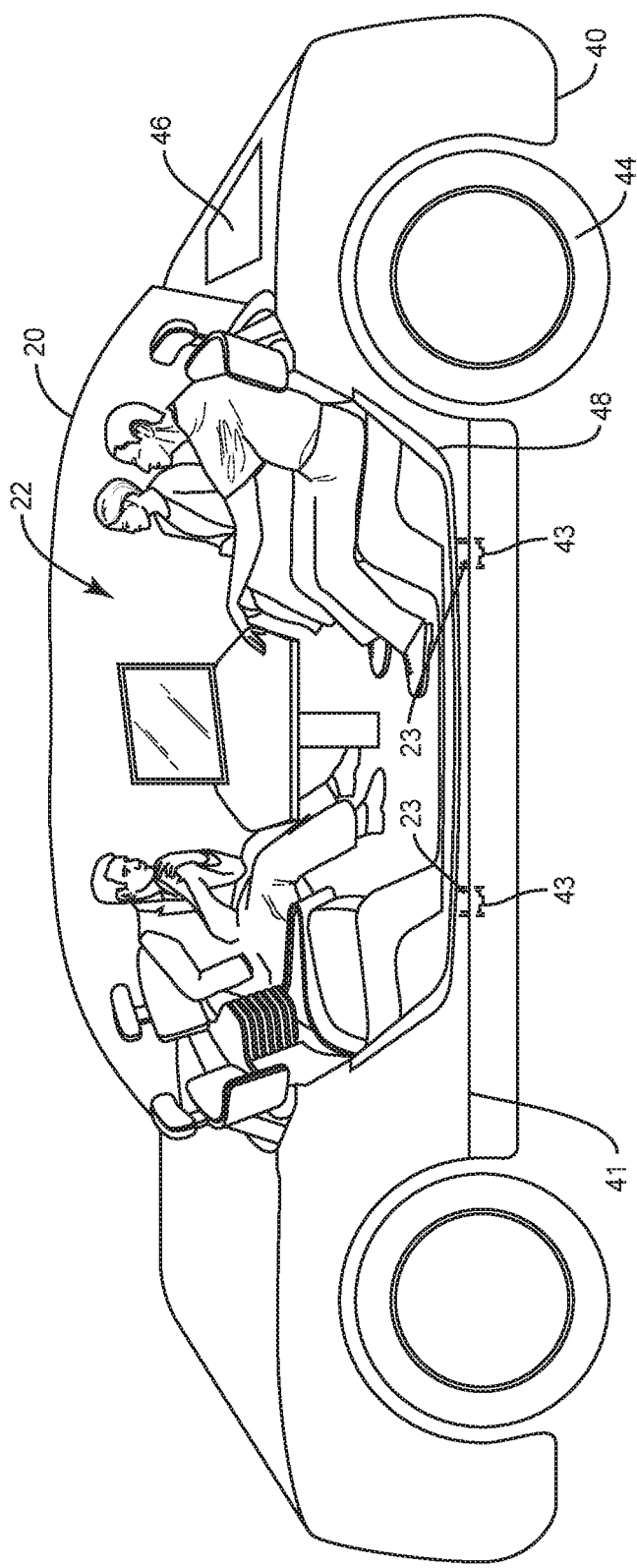
FIG. 6 is a side schematic cut-away view of an interior space of a pod that is attached to a vehicle.

Various different types of vehicles 40 can connect to and transport the pod 20. One type of vehicle 40 is configured to transport the pod 20 over land. FIG. 6 illustrates an example of a land-based pod 20 that includes a base 41 that supports the pod 20. The base 41 includes a receptacle 48 that receives the pod 20. The vehicle 40 can also include one or more wheels 44 that are driven by an engine 46 for transportation over land.

One or more connectors 43 can be positioned at the base 41 to connect to the pod 20. The connectors 43 can provide for a mechanical connection to prevent detachment when the vehicle 40 is transporting the pod 20. In one example, one or more of the connectors 43 can also include one or more of the connectors 53, 54, 55 for operatively connecting the pod 20 to one or more functional systems in the vehicle 40.

Figure 7:
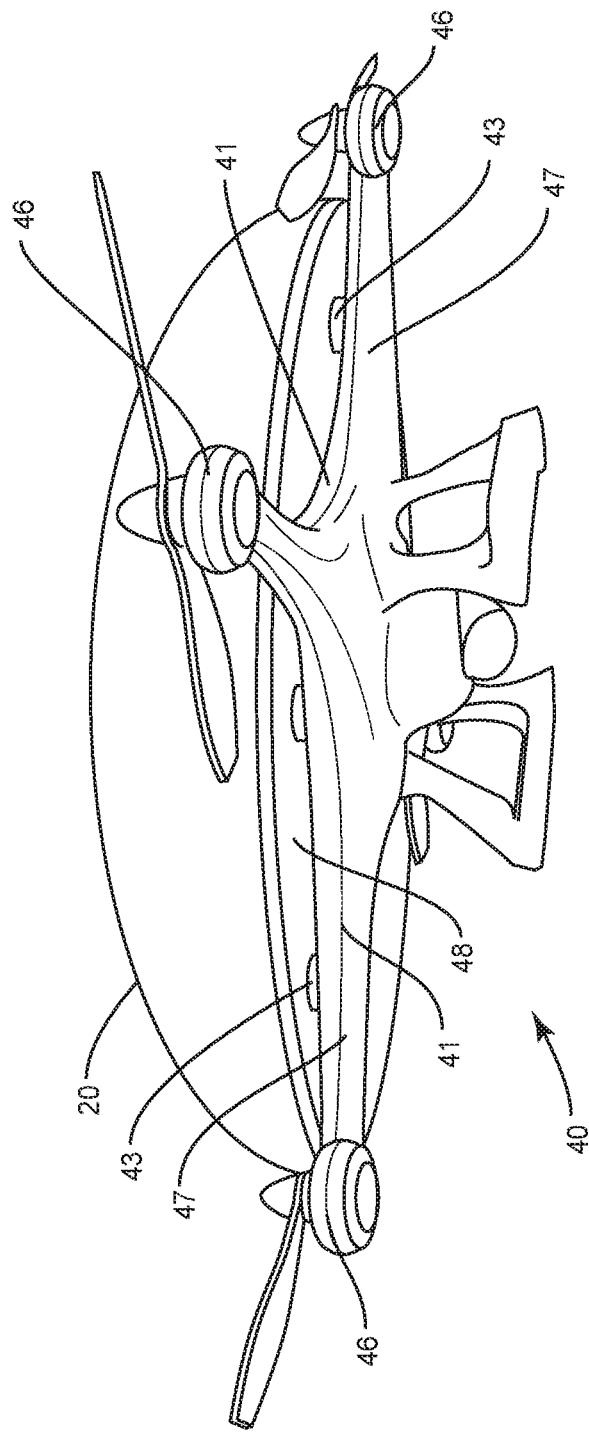
FIG. 7 is a perspective view of a pod connected to a vehicle.

FIG. 7 illustrates a vehicle 40 that provides for air transportation of a pod 20. The vehicle 40 includes a base 41 with a receptacle 48 that receives the pod 20. One or more connectors 43 connect the pod 20 to the base 41. The vehicle 40 also includes wings 47 and engines 46 that provide for flight. A control position 49, such as a cockpit, provides for a pilot to control the transportation. Other vehicles 40 can provide for autonomous transportation and thus may not include a control position 49.

The vehicles 40 can be driven by one or more engines 46. The engines 46 can also include a propulsion system.

Figure 8:
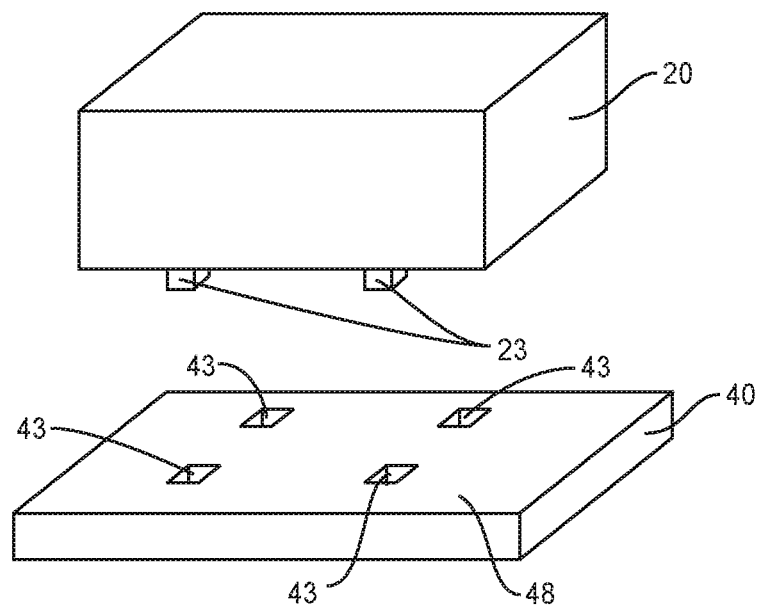
FIG. 8 is a schematic perspective view of a pod with connectors configured to connect to a vehicle with corresponding connectors.

The connectors 23, 43 can include a variety of different configurations to mechanically connect the pod 20 and the vehicle 40. FIG. 8 illustrates an example with the connectors 23 comprising extensions that extend outward from the pod 20. Connectors 43 on the vehicle 40 include corresponding openings sized to receive the extensions.

Figure 9:
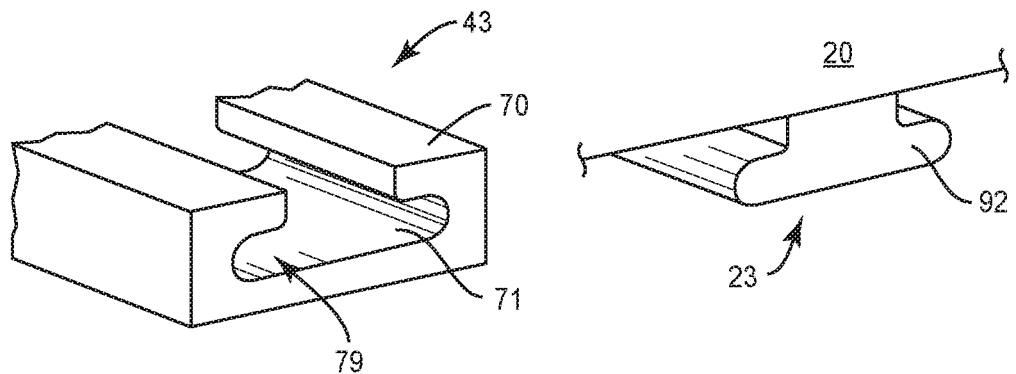
FIG. 9 is a partial perspective view of connectors on a pod and a vehicle.

FIG. 9 illustrates another connector 43 for a vehicle 40. The connector 43 includes a track 70 that is positioned at the receptacle 48 (not illustrated in FIG. 9). The track 70 includes a slot 71 with an open end 79. The connector 23 includes a body 92 extends outward from the pod 20 is sized and shaped to fit within the slot 71. The body 92 is sized to slide into the slot 71 and move along track 70 to the desired position. The number of tracks 70 can vary. In one example, a single track 70 is used to mechanically connect the pod 20 and vehicle 40. Other examples include multiple tracks 70.

Figure 10:
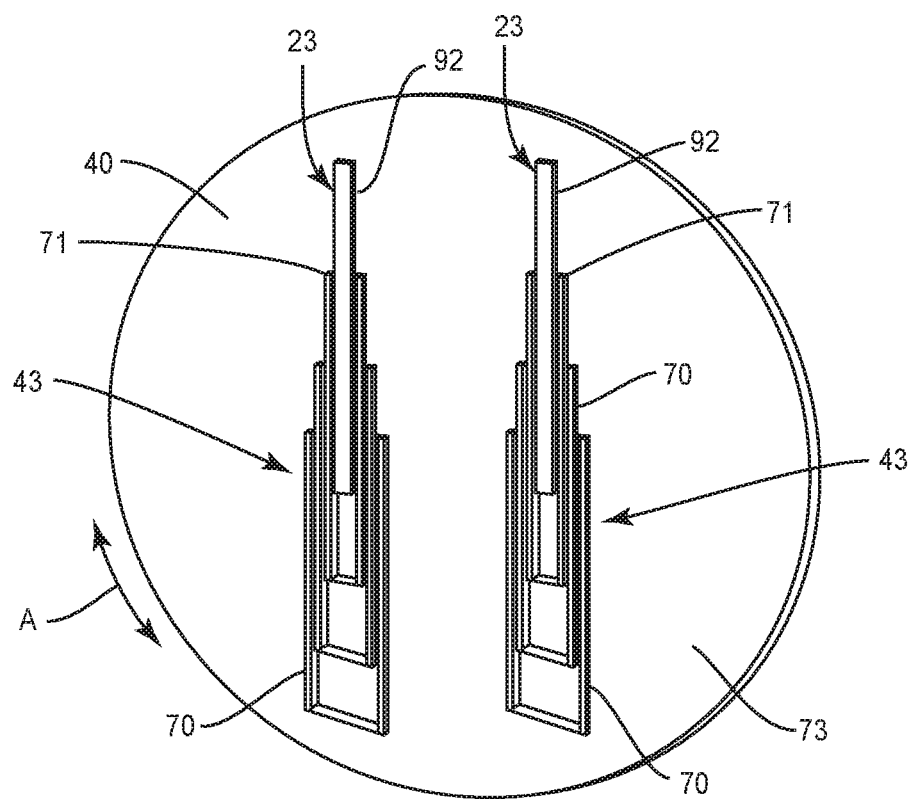
FIG. 10 is a perspective view of extendable connectors mounted on a platform of a vehicle and corresponding connectors of a pod positioned in the vehicle connectors.

The shape of the connectors 23, 43 can vary. FIG. 9 includes the slot 71 and body 92 including a sectional shape that resembles a T. FIG. 10 includes the slot 71 and body 92 each including a rectangular sectional shape. The rectangular body 92 is sized to fit into and slide along the slot 71 formed by the track 70.

The track 70 can be formed from one or more sections. FIG. 9 includes the track 70 formed from a single section. FIG. 10 includes a pair of tracks 70 each formed by multiple sections that are connected together in a telescoping manner. The length of the tracks 70 can be adjusted based on the amount of overlap between the various sections. In one example, the tracks 70 are extendable to facilitate attachment between the vehicle 40 and the pod 20. In one example, the tracks 70 can be extended with the end 72 positioned underneath the pod 20 at the corresponding connector 23.

One or both connectors 23, 43 can be positioned on a movable platform 73 as illustrated in FIG. 10. The platform 73 can rotate are illustrated by arrow A to align the tracks 70 towards the pod 20. In one example, the platform 73 can rotated on a 360° circle to accept the pod 20 from front, back, and lateral sides.

Connectors 23, 43 can also include mechanical connectors such as but not limited to nuts, bolts, and straps. These can be used in combination with or in place of the other connectors described above.

The configurations of the various connectors 23, 43 can vary. For example, tracks 70 can be positioned on the pods 20 and connect with corresponding connector bodies 92 on the vehicles 40. Alternatively, the tracks 70 can be positioned on the vehicles 40 and connect with corresponding connector bodies 92 on the pods 20.

Figure 11:
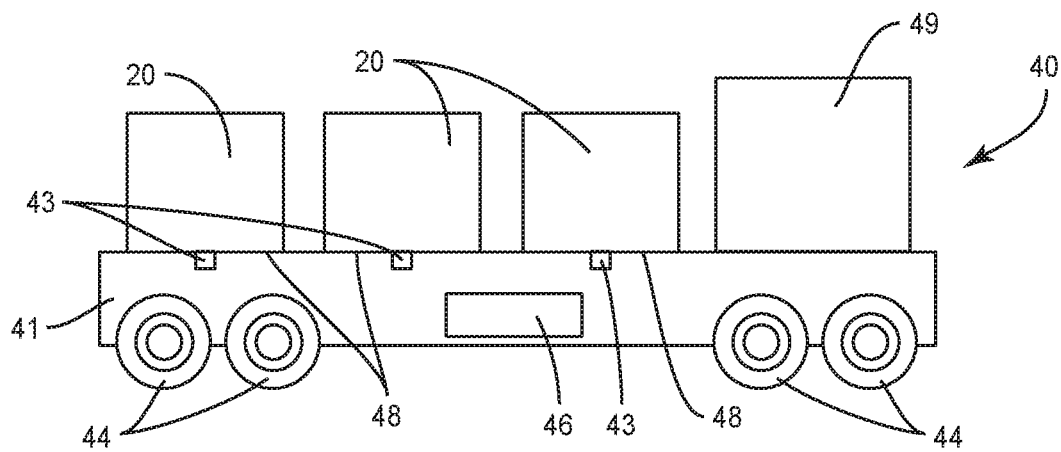
FIG. 11 is a side schematic view of a vehicle configured to attach to and transport multiple pods.

The vehicles 40 can be configured to transport a single pod 20, such as the example of FIGS. 6 and 7. The vehicles 40 can also be configured to transport multiple pods 20. FIG. 11 includes a vehicle 40 that includes an elongated base 41 with multiple receptacles 48. One or more connectors 43 are positioned at each receptacle 48 to connect the pods 20 to the vehicle 40. The vehicle 40 also includes an engine 46 that drives one or more of the wheels 44 for transportation over land. A control position 49 provides a location for a driver to operate the vehicle 40.

Figure 12:
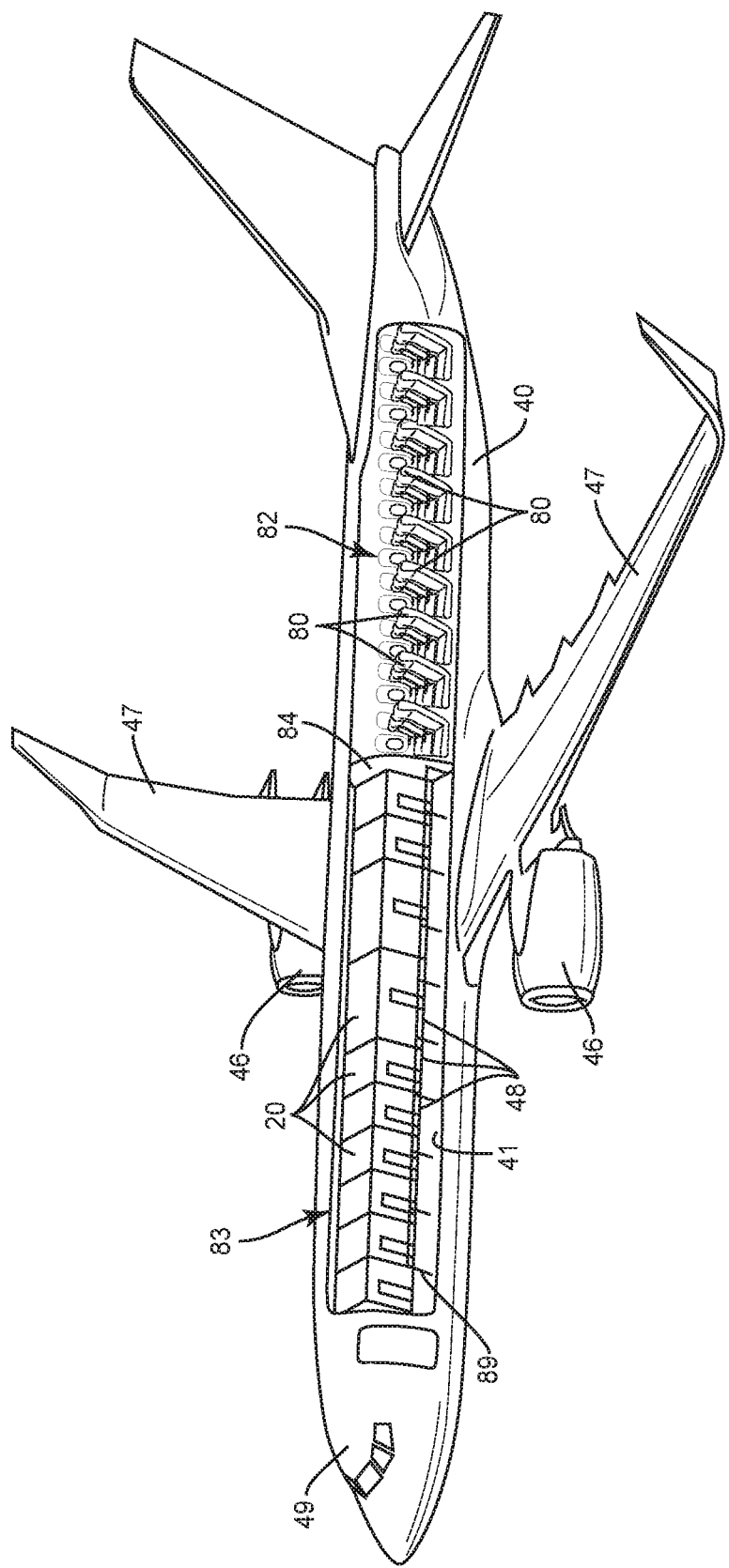
FIG. 12 is a perspective cut away view of a vehicle equipped to transport pods as well as other travelers.

FIG. 12 illustrates a vehicle 40 configured as an aircraft for flight. The vehicle 40 includes a base 41 and wings 47 with one or more engines 46 equipped for flight. The vehicle 40 also includes multiple receptacles 48 each configured to receive one or more pods 20. A control position 49 that includes a cockpit is positioned at the front of the vehicle 40 to control the vehicle 40.

As further illustrated in FIG. 12, the vehicle 40 is equipped with an interior pod section 83 to transport the pods 20. In one design, the pod section 83 is pressurized to allow the persons to exit their pods 20 during flight (such as to use restrooms or a lounge). The vehicle 40 can also include a cabin 82 with one or more seats 80 for transporting persons. The cabin 82 can also include one or more lavatories, and a galley. The relative sizes of the pod section 83 and the cabin 82 can vary. FIG. 12 includes an example in which each occupies roughly one-half of the area of the vehicle 40. Other examples can include the sections 83 having various relative dimensions.

In one example, the pod section 83 is separate from the cabin 82. A bulkhead wall 84 extends across the interior space of the vehicle 40 to separate the two sections. In another example, the pod section 83 and cabin 82 share the same interior space. A curtain or other minor impediment can be positioned between the sections.

Figure 13:
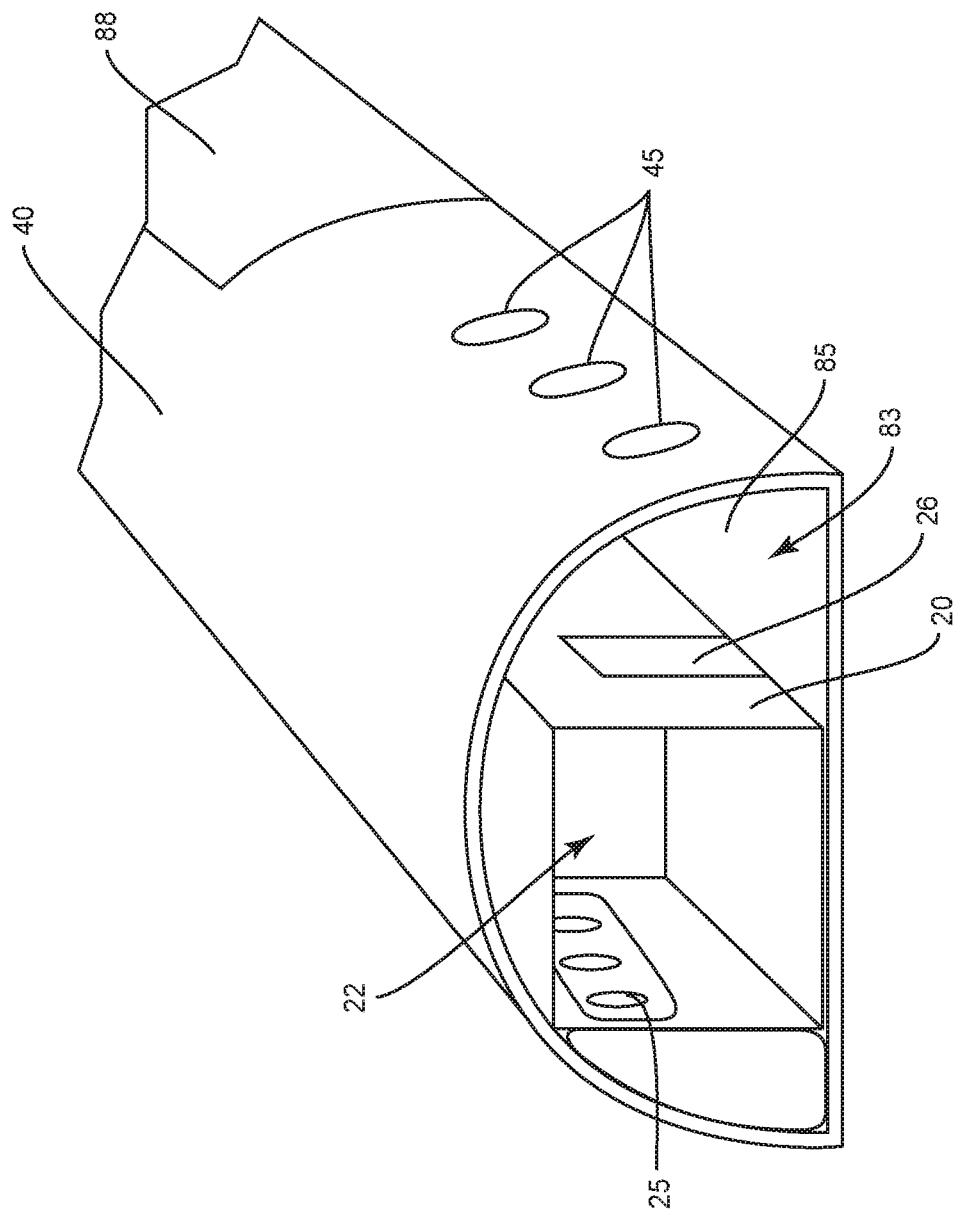
FIG. 13 is a partial section view of a pod positioned within an interior of a vehicle.

FIG. 13 illustrates a pod 20 positioned within a pod section 83 of a vehicle 40. One or more windows 25 on the pod 20 can be aligned with one or more windows 45 on the vehicle 40 to provide for a view for the travelers within the interior space 22 of the pod 20. In one design, the pod 20 is smaller than the pod section 83 thus forming an aisle 85 along the interior of the vehicle 40. A door 26 of the pod 20 can open into the aisle 85 to allow for travelers to exit the pod 20 and move about the vehicle 40 during flight. In one design, the aisle 85 leads along the entire length of the vehicle 40, including the cabin 82. In vehicles 40 equipped with a pod section, one or more doors 88 can lead into the interior of the vehicle 40 for loading and unloading of the pods 20.

Transportation using a pod 20 can provide for a traveler to remain within the interior space 22 of the pod 20 during travel. The traveler is not interrupted during the travel and can perform various functions that are supported by the interior space 22. Thus the traveler is not exposed to the difficulties of travel and can be productive during this time.

Figure 14:
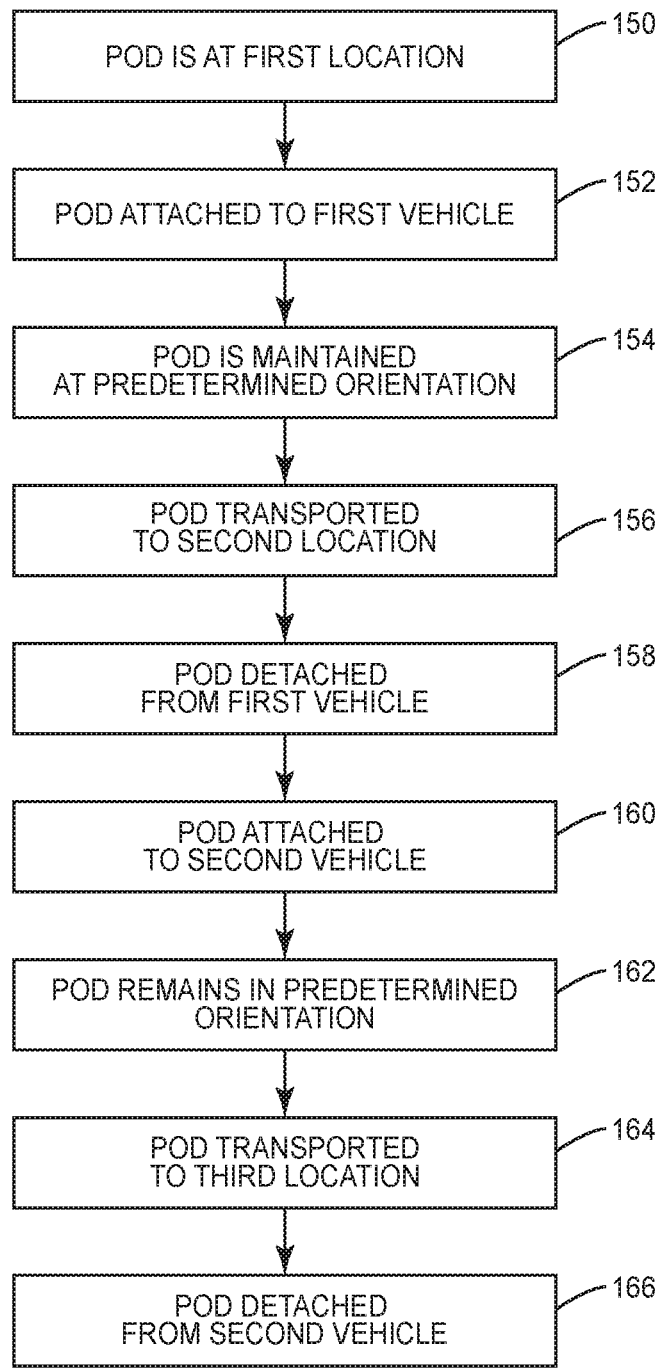
FIG. 14 is a flowchart diagram of a method of transporting a person or object using a pod system.

FIG. 14 illustrates a method of transportation using a pod 20. Initially, the pod 20 is located at a first location. For example, the pod 20 can be located at the traveler's house or place of business. The traveler can enter the pod 20 prior to being attached to a vehicle 40 and while the pod 20 is in a predetermined orientation (block 150). The traveler can enter the pod 20 at their leisure and begin one or more activities such as starting a meeting with one or more other travelers, work at a desk, sleep, watch a movie, etc.

The pod 20 is attached to a first vehicle 40 at the first location (block 152). The attachment process can provide for the pod 20 to remain in the same orientation such that the traveler is not disturbed and can continue with their activity. This can include sliding the pod 20 onto the vehicle 40, lifting the pod 20 to remain in the same orientation and then moving the pod 20 over and onto the vehicle 40. The pod 20 is attached to the vehicle 40 at the first location with the pod 20 being in the same orientation (block 154).

With the pod 20 attached to the vehicle 40, the pod 20 is transported from the first location to a remote second location (block 156). This can include a relatively short distance, such as transporting the pod 20 to a nearby airport, train station, or marine dock. This can also include more extensive travel such as along a highway for hundreds of miles. This transportation includes a first mode, such as a land-based transportation. During the transportation, the pod 20 remains in the same orientation. This allows for the travel to continue with their activities.

When the vehicle 40 reaches the second location, the pod 20 is detached from the vehicle 40 (block 158). This can include detaching the one or more connectors 23, 43 that engage together to secure the pod 20. During detachment, the pod 20 again remains in the same orientation to prevent interruption of the traveler. In some examples, the travel is complete upon arrival at the second location and the traveler can exit the pod 20.

In the example of FIG. 14, the travel continues with the pod 20 being attached to a second vehicle 40 (block 160). The attachment maintains the orientation of the pod 20. In one example, the pod 20 is transferred directly from the first vehicle 40 to a second vehicle 40. Other examples can include the pod 20 being placed onto the ground or other like support prior to being attached to the second vehicle 40. In another example, the pod 20 is transported by an intermediate vehicle to the second vehicle 40. For example, the first vehicle 40 can transport the pod 20 from a business office to an airport. An intermediate shuttle can then transport the pod 20 from a drop zone at the airport to another vehicle 40, such as an aircraft for the second leg of the travel.

The pod 20 is attached to the second vehicle 40 at the second location while it remains in the predetermined orientation (block 162). Once attached, the pod 20 is transported by the second vehicle 40 to a remote third location (block 164). During the travel, the pod 20 remains in the same orientation. The second vehicle 40 can use a different second mode of transportation. In one example, the first mode provides for land-based transportation and the second vehicle 40 provides for air-based transportation.

When the second vehicle 40 arrives at the destination, the pod 20 is detached (block 166). During the detachment, the pod 20 remains in the same orientation to again provide for the traveler to continue with their functions. If this location is the ultimate destination, the traveler can exit the pod 20. If additional travel is required, the traveler can remain in the pod 20 until another vehicle 40 transports the pod 20 to another location.

In one example, the pod 20 can be equipped to support the traveler while they are at the destination. Thus, the traveler can remain with the pod 20. For example, the pod 20 can include a bed to provide for sleeping. The pod 20 can also include a sink, shower, and toilet to allow the traveler to use the pod 20 in the same manner as a hotel room.

As disclosed above, the pods 20 can be configured to transport one or more travelers. The pods 20 can also be configured to transport one or more objects. Examples of objects include but are not limited to packages, luggage, and freight. The pods 20 can also be configured to concurrently transport both one or more travelers and objects. For example, the interior space 22 can be arranged for one or more compartments 90 to be equipped to store and transport one or more objects, and one or more other compartments 90 configured to transport one or more travelers.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A transportation system to transport one or more persons, one or more objects, or a combination of persons and objects, the system comprising:
    a pod comprising:
        a frame;
        an interior space formed in the frame and configured to house the one or more persons or objects, the interior space comprising a seating arrangement secured to a floor of the pod to accommodate the one or more persons during travel;
        one or more pod connectors positioned on the frame;
    a plurality of vehicle each configured to individually connect to and transport the pod, each of the vehicles comprising:
        a base configured to support the pod and position the interior space for transport;
        one or more vehicle connectors positioned on the base and configured to engage with the one or more pod connectors to attach to the pod; and
    at least one of the vehicles configured to transport the pod by land and at least one of the vehicles configured to transport the pod by air.

2. The system of claim 1, wherein the frame further comprises wall segments that extend around and enclose the interior space.

3. The system of claim 2, further comprising windows in one or more of the wall segments and windows within one or more of the vehicles, the windows of the pod being positioned to align with the windows of the vehicle when the pod is mounted to one of the vehicle.

4. The system of claim 1, wherein a first one of the vehicles comprises wheels that are driven by an engine or propulsion system to transport the pod over land, and a second one of the vehicles comprises an aircraft engine and wings to transport the pod through the air.

5. The system of claim 1, wherein at least one of the one or more pod connectors and at least one or more of the vehicle connectors are configured to provide electrical power from the vehicle to the pod.

6. The system of claim 1, wherein one or more of the pod connectors and the vehicle connectors comprises one or more tracks and the other of the pod connectors and the vehicle connectors comprise one or more bodies that are sized to fit into and slide along slots in the one or more tracks to connect the pod to the vehicle.

7. The system of claim 1, wherein the one of the pod connectors and the vehicle connectors are connected to a rotatable platform for positioning at a variety of different angular positions.

8. The system of claim 1, further comprising a heating and ventilation system on the vehicle that supplies conditioned air to the pod when the pod is attached to the vehicle.

9. The system of claim 1, further comprising a first power source in the pod that supplies power to the pod and a second power source in each of the vehicles that supplies power to the vehicle, the second power source providing power to the pod when the pod is attached to the vehicle.

10. A transportation system comprising:
    a plurality of pods, each of the pods comprising:
        wall segments that extend around and form an interior space that is configured to house one or more persons, objects, or a combination of persons and objects with the interior space comprising furniture that can be configured into at least one of a meeting space with chairs and a bedroom with a bed;
        one or more pod connectors positioned on one or more of the wall segments;
    a plurality of vehicles each configured to connect to and transport one or more of the pods, each of the vehicles comprising:
        a base configured to support one or more of the pods;
        one or more vehicle connectors positioned on the base and configured to engage with the one or more pod connectors of the one or more pods;
    the plurality of vehicles configured to transport the one or more pods by two or more different modes of travel.

11. The system of claim 10, wherein a first one of the pods comprises a first size and a second one of the pods comprises a different second size, with each of the first and second ones of the pods configured to be connected to one or more of the vehicles.

12. The system of claim 10, wherein each of the vehicles further comprises a communication system configured to communicate with a remote entity, and each of the pods configured to connect to the communication system when the pod is connected to the vehicle.

13. The system of claim 10, wherein each of the pods comprises a first power source and each of the vehicles comprise a second power source, each of the pods configured to use the second power source to supply power to the pod and deactivate the first power source when the pod is connected to the vehicle.

14. The system of claim 10, further comprising a cabin area within at least one of the vehicles, the cabin area comprising seats to transport other travelers that are not within the pods.

15. The system of claim 10, wherein at least one of the one pods and at least one of the one vehicles are configured to provide conditioned air from the vehicle to the pod.

16. A method of transportation comprising:
positioning a pod at a first location and orienting the pod with the interior space being in a predetermined orientation;
attaching the pod to a first vehicle at the first location while the interior space remains in the predetermined orientation;
transporting the pod with the first vehicle from the first location to a remote second location using a first mode of transportation while the interior space remains in the predetermined orientation;
detaching the pod from the first vehicle at the second location while the interior space remains in the predetermined orientation;
attaching the pod to a second vehicle at the second location while the interior space remains in the predetermined orientation;
transporting the pod with the second vehicle from the second location to a remote third location using a different second mode of transportation while the interior space remains in the predetermined orientation; and
detaching the pod from the second vehicle at the third location while the interior space remains in the predetermined orientation.

17. The method of claim 16, further comprising transporting the pod on the ground with one of the first vehicle and the second vehicle and transporting the pod in the air with the other of the first vehicle and the second vehicle.

18. The method of claim 16, further comprising attaching one or more additional pods to the first vehicle and transporting the pod and the additional pods from the first location to the second location using the first mode of transportation.

19. The method of claim 16, further comprising:
moving conditioned air into the pod from a first heating and ventilation system in the pod;
attaching the pod to the first vehicle and thereafter deactivating the first heating and ventilation system; and
moving conditioned air into the pod from a second heating and ventilation system in the first vehicle.

20. The method of claim 16, further comprising attaching the pod to a first section of the second vehicle that is spaced away from a cabin area of the second vehicle.

* * * * *